US009768945B2

(12) United States Patent
Mueck et al.

(10) Patent No.: US 9,768,945 B2
(45) Date of Patent: Sep. 19, 2017

(54) ISOLATED SYSTEM DATA COMMUNICATION

(71) Applicant: Analog Devices, Inc., Norwood, MA (US)

(72) Inventors: Michael Mueck, Andover, MA (US); Lawrence Getzin, Concord, NH (US)

(73) Assignee: Analog Devices, Inc., Norwood, MA (US)

( * ) Notice: Subject to any disclaimer, the term of this patent is extended or adjusted under 35 U.S.C. 154(b) by 26 days.

(21) Appl. No.: 13/784,508

(22) Filed: Mar. 4, 2013

(65) Prior Publication Data
US 2013/0279611 A1    Oct. 24, 2013

Related U.S. Application Data

(60) Provisional application No. 61/636,797, filed on Apr. 23, 2012.

(51) Int. Cl.
*H04L 7/00*     (2006.01)
*H04Q 9/00*     (2006.01)
(Continued)

(52) U.S. Cl.
CPC ............ *H04L 7/0016* (2013.01); *G08C 25/00* (2013.01); *H04L 25/0264* (2013.01); *H04Q 9/00* (2013.01);
(Continued)

(58) Field of Classification Search
CPC  H04B 1/71637; H04B 1/719; H04B 25/4904; H04B 7/046; H04J 3/0608;
(Continued)

(56) References Cited

U.S. PATENT DOCUMENTS 4,845,421 A    7/1989  Howarth et al.
4,901,275 A    2/1990  Hardie et al.
(Continued)

FOREIGN PATENT DOCUMENTS

CN        1830199 A     9/2006
CN      101965686 A     2/2011
(Continued)

OTHER PUBLICATIONS

Extended European Search Report dated Feb. 5, 2016, in European Application No. 13164191.2 (9 pages).
(Continued)

*Primary Examiner* — Ted Wang
(74) *Attorney, Agent, or Firm* — Wolf, Greenfield & Sacks, P.C.

(57) ABSTRACT

Embodiments of the present invention may provide a system with a first and second circuit system separated by an electrical isolation barrier but provided in communication by at least one isolator device that bridges the isolation barrier. The first circuit system may include a communication system to transmit data across a common isolator device as a series of pulses, and the second circuit system may receive the series of pulses corresponding to the data. The second circuit system may include a detector coupled to the common isolator device to detect the received pulses, a oneshot to frame the received pulse(s), and a controller to reconstruct the data based on accumulated framed pulse(s). Therefore, noise induced spurious pulses outside the oneshot intervals may be ignored by the second circuit system providing improved noise immunity.

19 Claims, 4 Drawing Sheets

(51) Int. Cl.
  *G08C 25/00* (2006.01)
  *H04L 25/02* (2006.01)
  *H01F 19/08* (2006.01)

(52) U.S. Cl.
  CPC ....... *H01F 19/08* (2013.01); *H04Q 2209/823* (2013.01); *H04Q 2209/86* (2013.01)

(58) Field of Classification Search
  CPC ... H04L 7/046; H04L 7/0016; H04L 25/0264; H04Q 9/00; H04Q 2209/86; H04Q 2209/823; G08C 25/00; H01F 19/08
  USPC .................................................. 375/257, 259
  See application file for complete search history.

(56) References Cited

U.S. PATENT DOCUMENTS

| | | | |
|---|---|---|---|
| 5,384,808 A * | 1/1995 | Van Brunt | G06F 13/4072 326/30 |
| 5,594,329 A | 1/1997 | van Ettinger et al. | |
| 5,886,573 A | 3/1999 | Kolanek | |
| 5,940,447 A | 8/1999 | Connell et al. | |
| 5,952,849 A | 9/1999 | Haigh | |
| 6,167,132 A | 12/2000 | Krone et al. | |
| 6,262,600 B1 | 7/2001 | Haigh et al. | |
| 6,359,983 B1 | 3/2002 | Krone et al. | |
| 6,519,339 B1 | 2/2003 | Sacca et al. | |
| 6,873,065 B2 | 3/2005 | Haigh et al. | |
| 6,922,080 B2 | 7/2005 | Haigh et al. | |
| 7,061,421 B1 | 6/2006 | Xiao et al. | |
| 7,075,329 B2 | 7/2006 | Chen et al. | |
| 7,447,492 B2 | 11/2008 | Dupuis | |
| 7,515,076 B1 | 4/2009 | Singh et al. | |
| 7,545,059 B2 | 6/2009 | Chen et al. | |
| 7,675,444 B1 | 3/2010 | Smith et al. | |
| 7,738,568 B2 | 6/2010 | Alfano et al. | |
| 8,089,311 B2 | 1/2012 | Chen | |
| 8,736,343 B2 | 5/2014 | Chen et al. | |
| 9,184,588 B2 | 11/2015 | Mueck | |
| 2004/0080885 A1* | 4/2004 | Gaksch et al. | 361/62 |
| 2004/0239487 A1 | 12/2004 | Hershbarger | |
| 2004/0264941 A1 | 12/2004 | Hirasaka | |
| 2005/0172063 A1 | 8/2005 | Hofmann et al. | |
| 2006/0199620 A1 | 9/2006 | Greene et al. | |
| 2008/0163000 A1 | 7/2008 | McKim et al. | |
| 2008/0198904 A1 | 8/2008 | Chang | |
| 2008/0267301 A1 | 10/2008 | Alfano et al. | |
| 2009/0113222 A1 | 4/2009 | Lee | |
| 2009/0168462 A1 | 7/2009 | Schopfer | |
| 2009/0212759 A1 | 8/2009 | Melanson | |
| 2009/0243683 A1 | 10/2009 | Ochi et al. | |
| 2010/0141282 A1 | 6/2010 | Heath et al. | |
| 2010/0246646 A1* | 9/2010 | Gaalaas | 375/219 |
| 2010/0250820 A1 | 9/2010 | Gaalaas et al. | |
| 2011/0189952 A1 | 8/2011 | Barrenscheen et al. | |
| 2012/0139358 A1 | 6/2012 | Teggatz et al. | |
| 2013/0027107 A1 | 1/2013 | Nohara | |
| 2013/0088264 A1 | 4/2013 | Barrenscheen et al. | |
| 2013/0201050 A1 | 8/2013 | Hellsten | |
| 2013/0278077 A1 | 10/2013 | Mueck | |
| 2013/0278438 A1 | 10/2013 | Mueck | |
| 2013/0294111 A1 | 11/2013 | Persson et al. | |

FOREIGN PATENT DOCUMENTS

| | | |
|---|---|---|
| EP | 1 309 144 A1 | 5/2003 |
| EP | 1742337 A2 | 1/2007 |
| EP | 1978625 A2 | 10/2008 |
| EP | 2166660 A2 | 3/2010 |
| WO | WO 94/16390 A1 | 7/1994 |
| WO | 98/09411 A1 | 3/1998 |
| WO | 2004112371 A1 | 12/2004 |
| WO | WO 2007/002827 A2 | 1/2007 |
| WO | 2009108603 A1 | 9/2009 |

OTHER PUBLICATIONS

Extended European Search Report dated Feb. 24, 2016, in European Application No. 13164184.7 (8 pages).
Extended European Search Report dated Apr. 15, 2016 for Application No. EP 13164287.8.
Analog Devices, Converters for Motor Control. 2005. 8 pages.
Analog Devices, Isolated Sigma-Delta Modulator. AD7400 Datasheet, Rev. G. Jun. 2013. 20 pages.
Analog Devices, Using the AD7400A Isolated Sigma-Delta Modulator as an Isolated Amplifier. 2009. 2 pages.

* cited by examiner

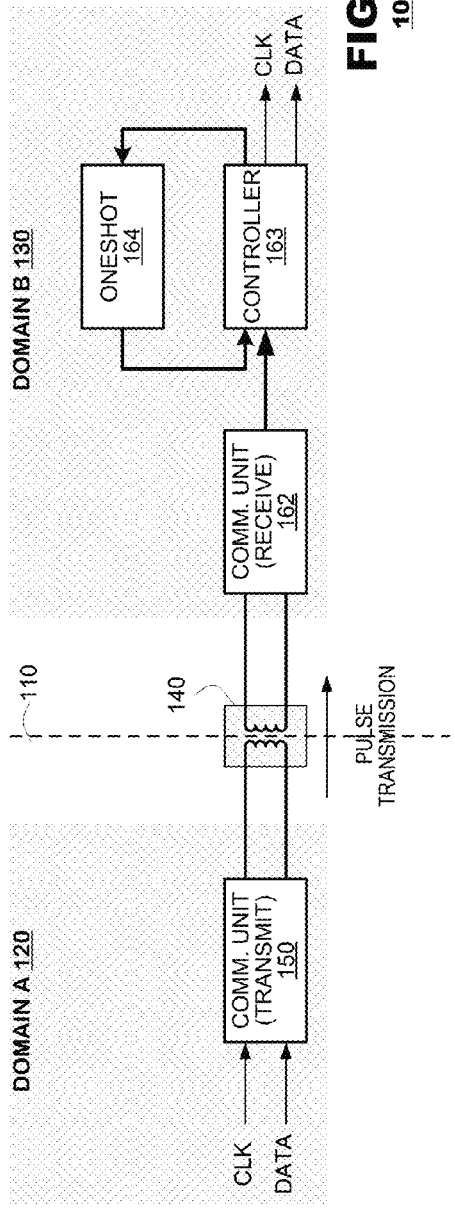
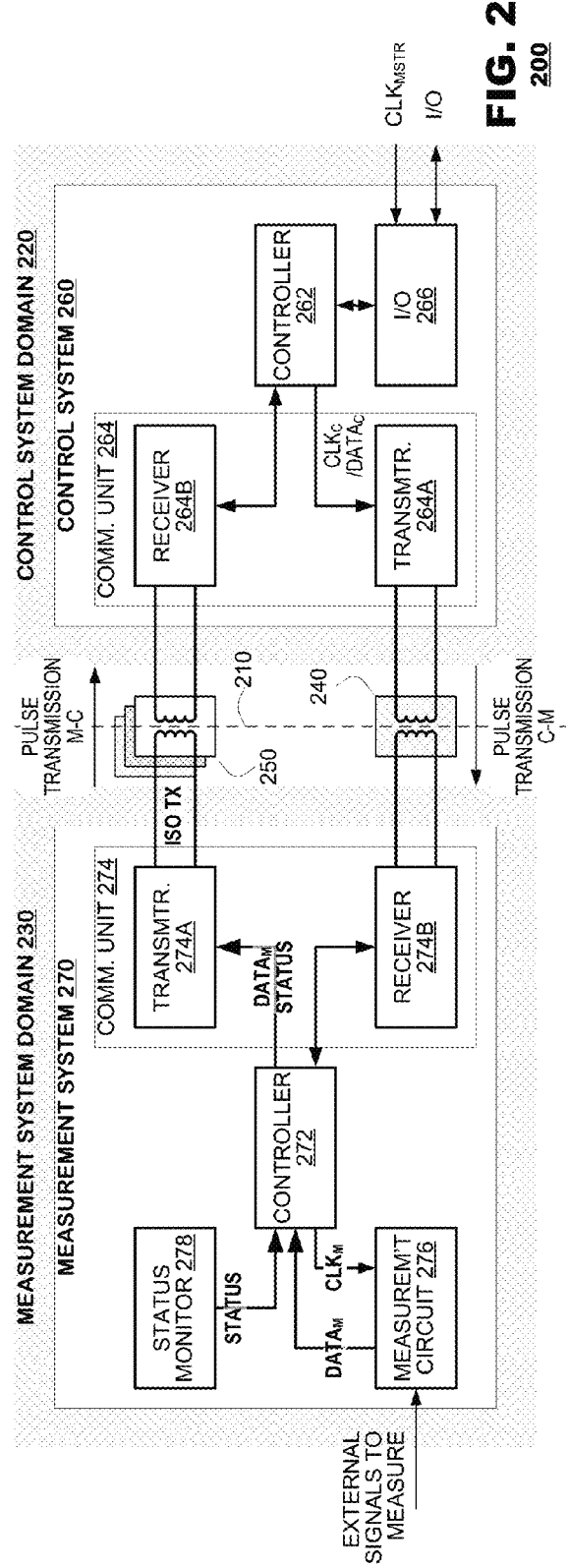

400

500

ISOLATED SYSTEM DATA COMMUNICATION

CROSS REFERENCE TO RELATED APPLICATION

The present invention benefits from priority afforded by U.S. patent application Ser. No. 61/636,797, entitled "Isolated Measurement System," filed Apr. 23, 2012, the disclosure of which is incorporated herein in its entirety.

BACKGROUND

Isolated systems generally refer to two systems operating in two different voltage domains that are galvanically isolated from each other. For example, an isolated measurement system typically includes a measurement system to measure external signals and a control system to control the measurement system and receive measurement data therefrom. The measurement and control systems operate in two different voltage domains and, thus, are galvanically isolated from each other.

Oftentimes, the two different voltage domain systems communicate with each other over isolator device(s). For example, the control system can send control and timing information to the measurement system, and the measurement system can adjust its operations based on the received control and timing information. Also, the measurement system can send measurement data to the control system.

However, communication between the two systems can suffer from issues such as latency problems and noise induced errors leading to imprecise operations. For example, a clock signal transmitted from one system to another can be delayed so as to cause unsynchronized operations between the two systems. Also, noise errors can corrupt communication between the two systems.

Therefore, the inventors recognized a need in the art for reliable communication techniques with improved noise immunity and latency in isolated systems.

BRIEF DESCRIPTION OF THE DRAWINGS

FIG. 1 illustrates an isolated system according to an embodiment of the present invention.

FIG. 2 illustrates an isolated system according to an embodiment of the present invention.

DETAILED DESCRIPTION

Figure 3A:
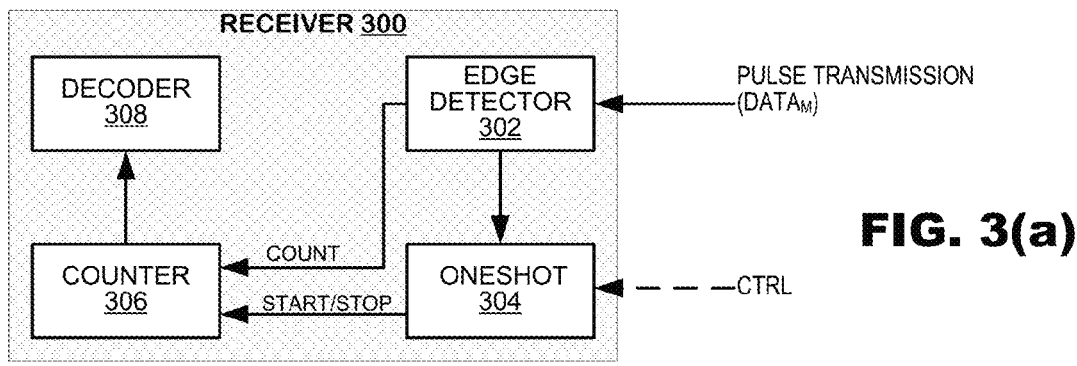
FIG. 3(a) illustrates a receiver according to an embodiment of the present invention.

Embodiments of the present invention may provide a system with a first and second circuit system separated by an electrical isolation barrier but provided in communication by at least one isolator device that bridges the isolation barrier. The first circuit system may include a communication system to transmit data across a common isolator device as a series of pulses, and the second circuit system may receive the series of pulses corresponding to the data. The second circuit system may include a detector coupled to the common isolator device to detect the received pulses, a oneshot to frame the received pulse(s), and a controller to reconstruct the data based on accumulated framed pulse(s).

Embodiments of the present invention may provide a method of communicating across an isolation barrier. The method may include receiving a first pulse across the isolation barrier, framing the received pulse in a oneshot interval, accumulating a packet of the one or more pulse(s) received during the oneshot interval, and reconstructing data based on the accumulated pulse(s) in the packet.

Embodiments of the present invention may also provide method for clock error correction. The method may include receiving a first pulse across an isolation barrier, framing the received pulse in a oneshot interval, accumulating a packet of the one or more pulse(s) received during the oneshot interval, toggling a clock signal based on receiving the first pulse, confirming the clock signal toggling based on the accumulated pulse(s) in the packet, and if an error is detected, correcting the error at the next packet.

FIG. 1 illustrates an isolated system 100 according to an embodiment of the present invention. The system 100 may define an isolation barrier 110 that establishes two galvanically isolated voltage domains 120, 130. Each voltage domain 120, 130 may have voltage supplies and ground references (not shown) that are isolated from each other. The system 100 may include an isolator device 140 to exchange communication signals between the voltage domains 120, 130 while still maintaining galvanic isolation between them. The communication signals may include clock edge information, control and timing data, measurement data, etc.

A communication unit 150 in the first domain 120 may transmit data as a series of pulses across the isolation barrier via the isolator device 140. In an embodiment, the transmitted data may include clock edge information and/or other data. The isolator device 140 may be implemented as capacitors, transformers, and/or opto-electronic devices. A single uni-directional isolator device 140 is shown in FIG. 1, but the system may include other isolator devices, which may be unidirectional and/or bidirectional, to provide higher bandwidth communication between the voltage domains 120, 130 as may be appropriate for individual application needs.

A communication unit 162 in the second domain 130 may also be coupled to the isolator device 140 to detect and receive the transmitted pulses from the first domain 120. The second domain 130 may also include a controller 163 and a oneshot 164 to reconstruct the received pulses. The oneshot 164 may frame the received pulse(s) so that the controller 163 may reconstruct the data based on the number of accumulated pulses in the oneshot 164 window. The oneshot 164 may provide a oneshot interval (i.e., time window) for the controller 163 to receive the pulses for reconstruction.

In an embodiment, the controller 163 may initially trigger the oneshot 164 to start the oneshot interval to receive the pulse(s). The interval may be closed after a predetermined time (i.e., the oneshot 164 may time out). Thus, the oneshot 164 may frame an expected maximum number of pulses.

In another embodiment, the controller 163 may initially trigger the oneshot 164 to start the oneshot interval to receive the pulse(s), and subsequent pulse(s) that are received within the one-shot interval may extend the window. The window may be closed after a predetermined time of no pulse detection (i.e., the oneshot 164 may time out). Thus, the oneshot 164 may be retriggerable in order to frame a variable number of pulses.

In another embodiment, a first received pulse may trigger the oneshot 164 to start the oneshot interval to receive any subsequent pulses. The window may be closed after a predetermined time (i.e., the oneshot 164 may time out). Thus, the oneshot 164 may frame an expected maximum number of pulses.

In another embodiment, a first received pulse may trigger the oneshot 164 to start the oneshot interval and subsequent pulse(s) that are received within the one-shot interval may extend the window. The window may be closed after a predetermined time of no pulse detection (i.e., the oneshot 164 may time out). Thus, the oneshot 164 may be retriggerable in order to frame a variable number of pulses.

The controller 163 may reconstruct the data based on the number of accumulated pulse(s) in the oneshot interval. Thus, noise errors may be reduced because, for example, spurious pulses occurring outside the one-shot interval may be properly excluded in the reconstruction of real data transmissions. Therefore, the oneshot may provide improved noise immunity for data transmission in an isolated system.

Further details and embodiments of the oneshot communication technique will now be discussed in relation to implementation in an isolated measurement system. FIG. 2 illustrates an isolated measurement system 200 according to an embodiment of the present invention. The system 200 may define an isolation barrier 210 that establishes two galvanically isolated voltage domains 220, 230. Each voltage domain 220, 230 may have voltage supplies and ground references that are isolated from each other. The system 200 also may include various isolator devices 240, 250 to exchange timing signals and data between the voltage domains 220, 230 while still maintaining galvanic isolation between them. In the system 200 illustrated in FIG. 2, the first voltage domain 220 may include a control system 260 to manage operations of the system 200 and, therefore, it is called a "control system domain" herein. The second voltage domain 230 may include a measurement system 270 and, therefore, it is called a "measurement system domain" herein.

The control system 260 and measurement system 270 may exchange communication with each other via the isolators 240, 250. The communication may include the exchange of control signals, timing signals and/or other data. The isolators 240, 250 may be implemented as capacitors, transformers and/or opto-electronic devices. A pair of isolators 240, 250 is shown in FIG. 2 where one isolator 240 carries control signals (described below) from the control system 260 to the measurement system 270 and a second isolator 250 carries data signals (described below) from the measurement system 270 to the control system 260. In the example of FIG. 2, a single isolator 240, 250 is shown for communication in each direction but the principles of the present invention are not so limited. The system 200 may include a larger number of isolators, particularly for communication of data from the measurement system 270 to the control system 260, to provide higher bandwidth communication. Moreover, one or more of the isolators 240, 250 may be provided as bidirectional isolators.

FIG. 2 illustrates components of an exemplary control system 260, which may include a controller 262, a communication unit 264, and an input/output ("I/O") unit 266. The controller 262 may manage operation of the control system 260 and may generate timing references (shown as $CLK_C$) for components within the control system 260 and within the measurement system 270. The communication unit 264 may exchange bidirectional communication signals with the measurement system 270 via the isolators 240, 250. The I/O unit 266 may interface with processors and/or controllers external to the system 200 (not shown) which may enable transmission of data from the measurement system 270 reception of command(s) for management of the measurement system 200 and/or timing information (shown as $CLK_{MSTR}$).

FIG. 2 illustrates components of an exemplary measurement system 270, which may include a controller 272, a communication unit 274, measurement circuit(s) 276 and a status monitor 278. The controller 272 may manage operation of the measurement system 270 and may generate timing references for other components of the measurement system 270. The communication unit 274 may exchange bidirectional communication signals with the control system 260 of the control system domain 220 across isolators 240, 250. In an embodiment, the measurement circuit 276 and status monitor 278 each may generate data to be communicated from the measurement system 270 to the control system 260.

The measurement circuit 276 represents circuitry to measure various external signals input to the system 200 for a test subject (not shown). By way of example, the measurement circuits 276 may include one or more analog-to-digital converters ("ADCs") (not shown) to digitize externally provided voltages, each of which may be single or multi-bit ADCs (not shown). For example, the measurement circuit 276 may include one or more sigma-delta ("ΣΔ") ADCs. The measurement circuit 276 may perform its operations according to a measurement clock signal $CLK_M$ provided by the controller 272. In an embodiment, the measurement clock signal $CLK_M$ may be a reconstructed signal corresponding to $CLK_C$ from the control system domain 220 (described below). The measurement circuit 276 may generate measurement data $DATA_M$ based on the externally provided voltages.

The status monitor 278 may monitor operational status of the measurement system 270 and may generate feedback data, STATUS, representing such status for transmission to the control system 270. In an embodiment, status information may include error indicators representing malfunction of the measurement system, detection of an input signal that exceeds maximum or minimum threshold limits, state of voltage supplies within the measurement system, or other operational data indicating whether components of the measurement system 270 are operating properly.

The controller 272 may generate drive signals to the communication unit 274 to communicate the status information and measurement data across a common isolator 250 (or set of isolators). The controller 272 also may interpret signals received from the communication unit 274 to generate the timing signals $CLK_M$ that governs operation of the measurement circuits 276 as the clock.

The communication units 264, 274 each may include a transmitter 264A, 274A and a receiver 264B, 274B. The transmitters 264A, 274A may receive drive signals from their respective controllers 262, 272 and may generate drive signals that are appropriate for transmission to the respective isolators 240, 250. The receivers 264B, 274B may receive signals from their respective isolators 240, 250 and generate output signals to their respective controllers 262, 272. For example, in the case of transformer-based isolators, the transmitters 264A, 274A may receive digital input signals and generate pulsed signals that are amenable for transmission across the isolators. Such pulsed signals may be transmitted across the isolators 240, 250 to receivers, which may generate digital output signals therefrom. Moreover, receivers 264B, 274B may implement oneshot framing to provide better noise immunity (described below).

Figure 3B:
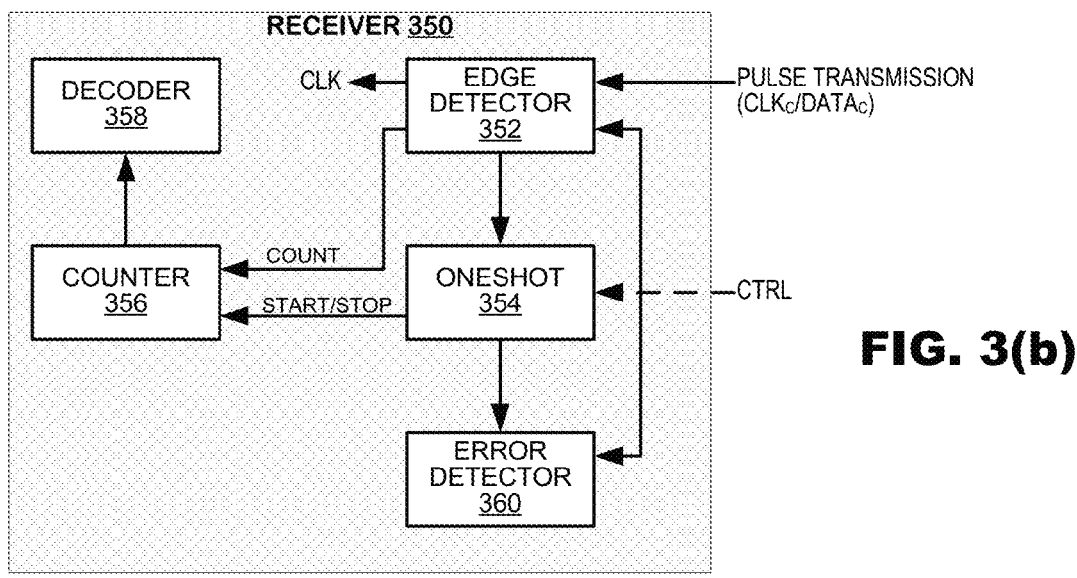
FIG. 3(b) illustrates a receiver according to an embodiment of the present invention.

FIG. 3(a) and FIG. 3(b) illustrate exemplary components of a receiver according to embodiments of the present invention. For example, receiver 300 in FIG. 3(a) may be implemented as receiver 264B in the control system 260 in FIG. 2. The receiver 300 may receive a data transmission in the form of pulse(s) and, in an embodiment, may represent measurement and/or status data from the measurement system. The receiver 300 may include an edge detector 302, a oneshot 304, a counter 306, and a decoder 308.

The edge detector 302 may be coupled to an isolator device (say, isolator 250) and may receive/detect pulse(s) transmitted across the isolator device. The edge detector 302 may detect pulse edges. The edge detector 302 may be coupled to the oneshot 304 and the counter 306. The edge detector 302 may provide an edge detection output to the re-triggerable oneshot 304 and the counter 306. The oneshot 304 may control a oneshot interval (i.e., time window) for the counter 306 to count the received pulse(s) detected by the edge detector 302. In an embodiment, the oneshot 304 may transmit start/stop commands to the counter 306 corresponding to the start/stop time of the oneshot interval.

In an embodiment, a controller (say, controller 262 in FIG. 2) may command the oneshot 304 to start the oneshot interval when the controller is ready to receive data. The controller's start command may be based on a clock signal (say, $CLK_C$ in FIG. 2). For example, the controller may be programmed to receive pulse(s) based on its operating clock. In another embodiment, a first pulse detected by the edge detector 302 may initially trigger the oneshot 304 to start the oneshot interval.

The oneshot 304 may time out after a oneshot window expires and may then transmit a stop signal to the counter 306. In an embodiment, the oneshot 304 may time out after a predetermined time that corresponds to an expected maximum number of pulse(s) (i.e., fixed length), and may then transmit a stop signal to the counter 306. In another embodiment, the oneshot interval length may be variable where subsequent pulse(s) received within the oneshot interval may extend oneshot interval length (i.e., subsequent pulse(s) may re-trigger the oneshot 304). If no pulse is received after a predetermined time following the last received pulse in the oneshot interval, the oneshot 304 may time out and may then transmit a stop signal to the counter 306. Therefore, spurious pulse(s), such as noise induced pulses, outside the oneshot intervals may be ignored by the receiver 300 providing improved noise immunity.

The counter 306 may count the number of pulses detected by the edge detector 302 during the oneshot interval set by the oneshot 304. After the 304 times out, the count in the counter 306 may be frozen and stored. The counter 306 may then reset the count.

The decoder 308 may be coupled to the counter 306. The decoder may include a register to store the counted number in the oneshot interval by the counter 306. The decoder 308 may reconstruct the data based on the oneshot interval counter number.

Receiver 350 in FIG. 3(b) may be implemented as receiver 274B in the measurement system 270 in FIG. 2. The receiver 350 may receive a data transmission in the form of pulse(s), and the data transmission may represent clock edge information and data ($CLK_C$/$DATA_C$). For example, the data may be control data from the control system 260. The receiver 350 may include an edge detector 352, a oneshot 354, a counter 356, a decoder 358, and an error detector 360.

The edge detector 352 may be coupled to an isolator device (say, isolator 240) and may receive/detect pulse(s) transmitted across the isolator device. The edge detector 352 may detect pulse edges. In this embodiment, the edge detector 352 may output a $CLK_M$ signal corresponding to clock edge information received. For example, reception of a first pulse may trigger toggling of the clock in the receiver domain. Toggling clock signals immediately based on a first received pulse improves the reconstructed clock latency but may also introduce clock errors when the pulses are corrupted by noise. For example, the clock signal may toggle erroneously based on a spurious received pulse. However, the error detector 360 may detect and correct such clock signal errors.

The error detector 360 may be coupled to the edge detector 352 and the re-triggerable oneshot 354. The error detector 360 may check/confirm if the clock signal toggle was correct or incorrect based on reconstructed clock edge information. For example, clock edge information may be transmitted as one pulse for a rising edge and two or more successive pulses for a falling edge. The edge detector 352 may toggle at the detection of the first pulse; however, the error detector 360 may confirm whether the toggle was correct or not based on the subsequent received pulse(s) or the absence of pulse(s) (described below). If a clock error such as a premature toggle is detected, the error detector 360 may instruct the edge detector 352 not to toggle at the reception of a next received pulse, thus, rectifying the premature toggle in the next clock edge.

The edge detector 352 may also be coupled to the oneshot 354 and the counter 356. The edge detector 352 may provide an edge detection output to the oneshot 354 and the counter 356. The oneshot 354 may control a oneshot interval to the counter 356 for counting for received pulse(s) as detected by the edge detector 352. In an embodiment, the oneshot 354 may transmit start/stop commands to the counter 356 corresponding to the start/stop time of the oneshot interval.

A controller may initially trigger the oneshot 354 to start the oneshot interval, or a first pulse detected by the edge detector 352 may initially trigger the oneshot 354 to start the oneshot interval. The oneshot 354 may time out after the oneshot interval expires and may then transmit a stop signal to the counter 356. In an embodiment, the oneshot 354 may time out after a predetermined time that corresponds to an expected maximum number of pulse(s), and may then transmit the stop signal to the counter 356. In another embodiment, the oneshot interval length may be variable where subsequent pulse(s) received within the oneshot interval may extend the oneshot interval (i.e., subsequent pulse(s) may re-trigger the oneshot 354). If no pulse is received after a predetermined time following the last received pulse in the oneshot interval, the oneshot 354 may time out and may then transmit the stop signal to the counter 356.

The counter 356 may count the number of pulses detected by the edge detector 352 during the oneshot interval set by the oneshot 354. After the oneshot 354 times out, the count in the counter 356 may be frozen and stored. The counter 356 may then reset the count.

The decoder 358 may be coupled to the counter 356. The decoder may include a register to store the counted number in the oneshot interval by the counter 356. The decoder 358 may reconstruct the data based on the oneshot interval counter number.

Figure 4:
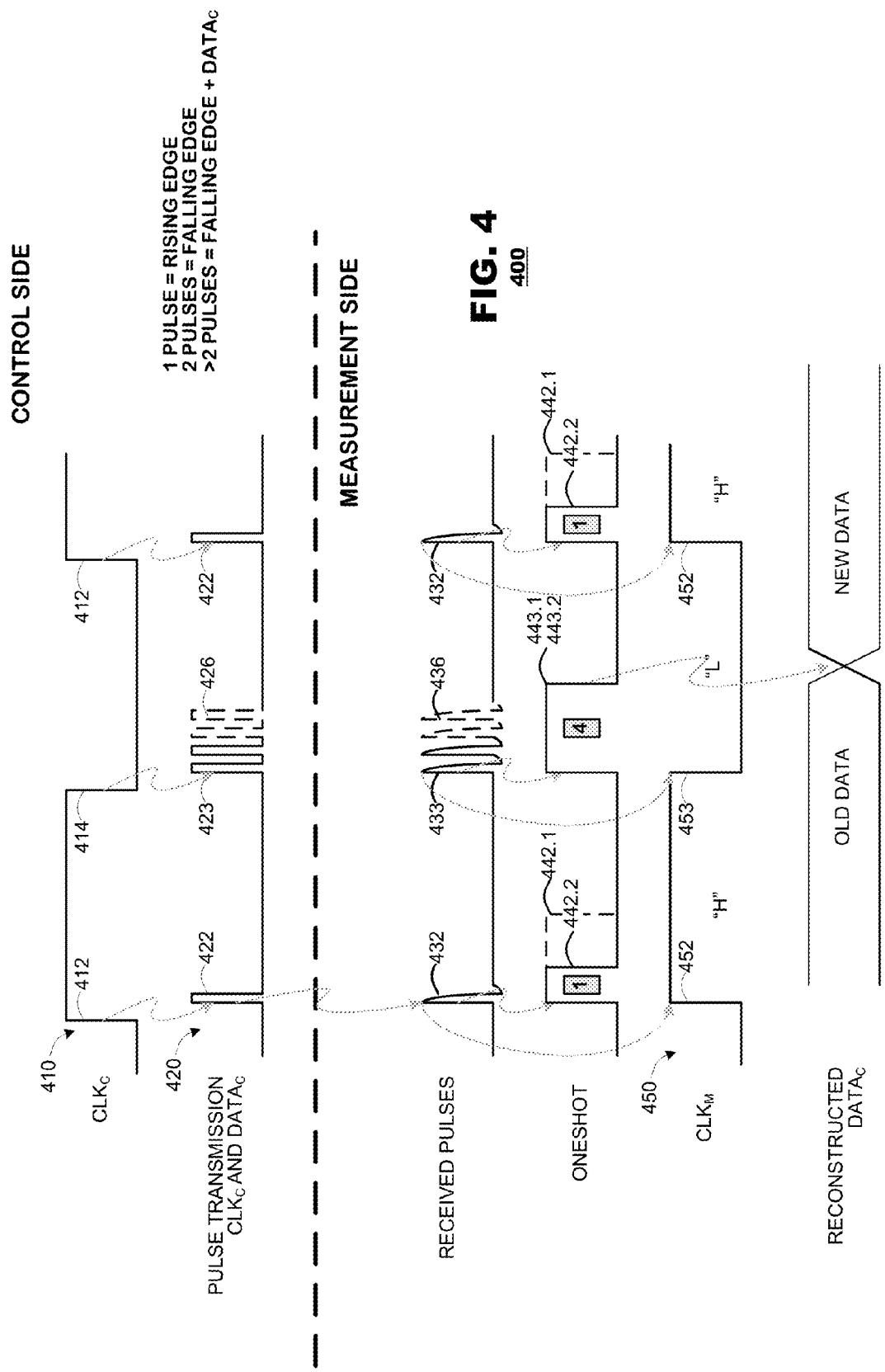
FIG. 4 is a data and clock timing diagram according to an embodiment of the present invention.

FIG. 4 illustrates a timing diagram 400 illustrating exemplary signals that may be communicated within the system 200 of FIG. 2 according to an embodiment of the present invention. On the control side, a clock signal $CLK_C$ may be generated therein, for example, by a controller 262 within the control system domain 220 (FIG. 2). The clock signal $CLK_C$ and other data ($DATA_C$) may be transmitted across an isolator device (say, isolator device 240). In an embodiment, the transmitter 264A may transmit a series of pulses of representing the $CLK_C$ clock edges and $DATA_C$. For example, a rising edge of $CLK_C$ may be transmitted as a single pulse, and a falling edge of $CLK_C$ may be transmitted as two successive pulses. Other data, such as $DATA_C$, may be encoded (e.g., thermometer encoded) and transmitted with the clock edge pulses. For example, other data may be transmitted as excess pulses greater than two pulses.

In FIG. 4, the $CLK_C$ signal 410 may include rising edges 412 and falling edges 414. The pulse transmission 420 may include single pulses 422 corresponding to the rising edges 412 and may include two successive pulses 423 corresponding to falling edge 414. The pulse transmission 420 may also include other pulse(s) 426 corresponding to $DATA_C$. As noted, the data transmission signal 420 may be transmitted across an isolator device to a measurement side.

On the measurement side, a receiver (say, receiver 274B) may receive/detect pulse(s) communicated over the coupled isolator device. Based on the received pulses, the receiver in conjunction with a oneshot (and controller) may reconstruct the transmitted clock signal $CLK_C$ and $DATA_C$. The receiver may detect pulse 432. The $CLK_M$ signal 450 may toggle states (high or low) immediately at the detection of a first pulse of a "packet" of pulses. For example, at the detection of pulse 432, the measurement side may immediately toggle $CLK_M$ signal 450 into a high state 452 because it was previously in a low state. The pulse 432 detection may also trigger the oneshot to start an oneshot interval (fixed oneshot interval 442.1 or variable oneshot interval 442.2). In another embodiment, a controller may trigger the oneshot to start the oneshot interval prior to the detection of pulse 432. The oneshot interval may be provided as a fixed oneshot interval 442.1, where the oneshot length is based on an expected maximum number of pulses. The fixed oneshot interval 442.1 may time out after a predetermined time (e.g., time associated with the expected maximum number of pulses). Alternatively, the oneshot interval may be provided as a variable oneshot interval 442.2. The variable oneshot interval 442.2 may be extended by subsequently received pulse(s) within the oneshot interval. Since no other pulse was detected after pulse 432 within a predetermined time period, the variable oneshot interval 442.2 may time out. The pulse count may have an accumulated value of one in the oneshot interval 442.1, 442.2. The pulse count may also confirm that the $CLK_M$ signal 450 toggling to high state 452 was correct.

Next, a first pulse of pulse packet 433, 436 may be detected. The $CLK_M$ signal 450 may toggle to a low state 453 at the detection of the first pulse in the pulse packet. The first pulse may also trigger the oneshot to start a oneshot interval (fixed oneshot interval 443.1 or variable oneshot interval 443.2). In this example, the fixed oneshot interval 443.1 and the variable oneshot interval 443.2 may have substantially the same duration. The fixed oneshot interval 443.1 may expire after the time associated with the expected maximum number of pulses, which in this example is four pulses. The variable oneshot interval 443.2 may be re-triggered three more times based on three other pulses in pulse packet 433, 436 being detected in successive predetermined time periods one after another. After the fourth pulse, the variable oneshot interval 443.2 may time out because no pulse was detected in the predetermined time period following the fourth pulse.

The pulse count, here, may have an accumulated value of four. The first two pulses 433 may correspond to the falling edge of the clock signal and validate/confirm the toggle of $CLK_M$ signal 450 into the low state 453. The next two pulses 436 detected and counted in the oneshot interval may correspond to $DATA_C$. Therefore, $DATA_C$ may be reconstructed as shown as "new data."

The oneshot framing technique reduces noise susceptibility by framing pulse counts in oneshot intervals where data reception is expected and to separate pulse packets. Furthermore, immediately toggling clock states at a first received pulse in pulse packets decreases latency. While immediately toggling clock states provides low latency, it may make the system susceptible to clock errors such as premature toggling. However, errors such as premature clock toggling may be corrected by the system quickly based on confirmation of accumulated count values in oneshot intervals associated with the clock toggle according to embodiments of the present invention.

Figure 5:
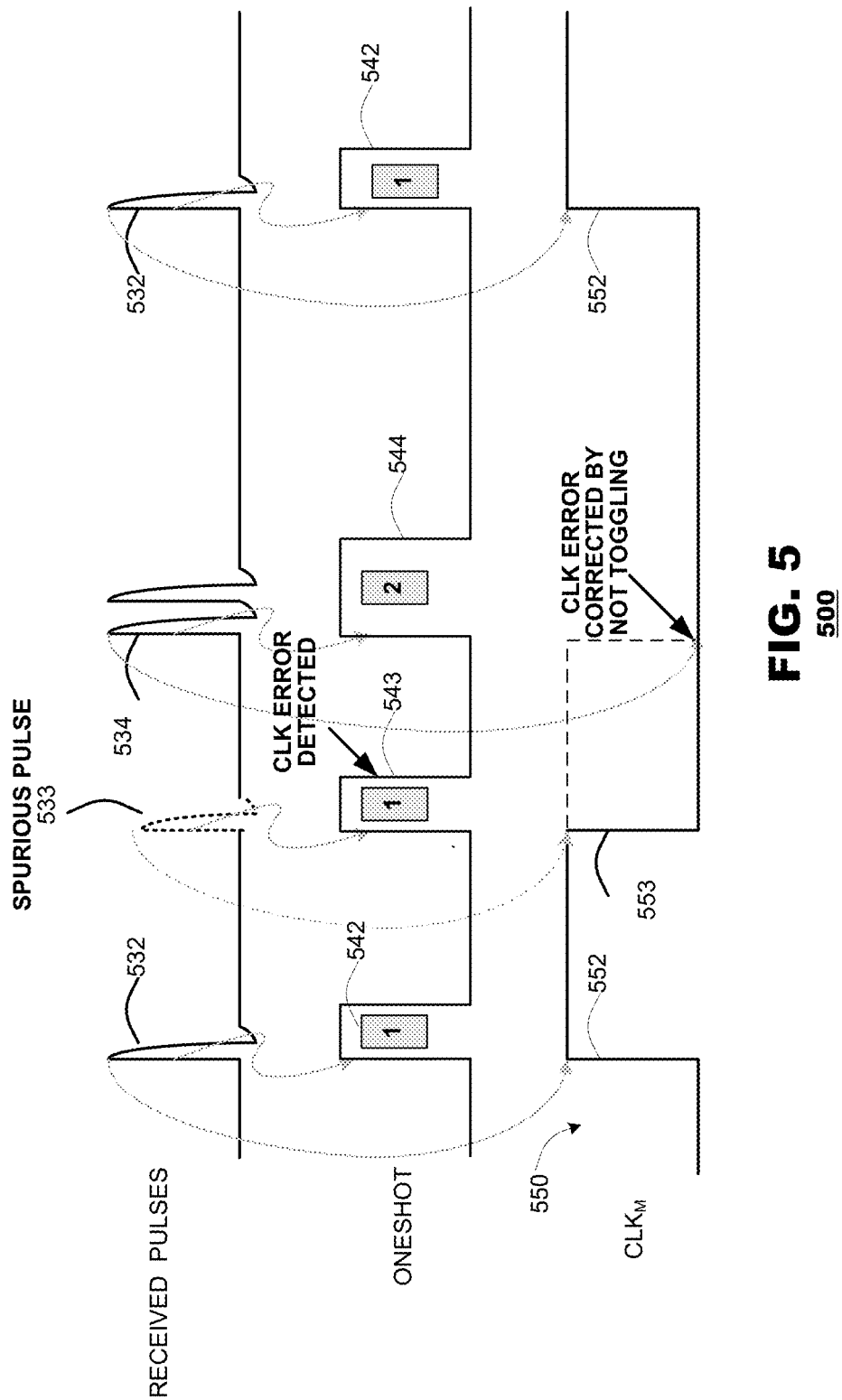
FIG. 5 is a clock timing diagram in the presence of noise according to an embodiment of the present invention.

FIG. 5 illustrates a timing diagram 500 illustrating exemplary signals that may be communicated within the system 200 of FIG. 2 and clock error correction according to an embodiment of the present invention. The timing diagram 500 illustrates only the receive side in the isolated system. Also, timing diagram 500 illustrates an exemplary initial pulse triggering the re-triggerable oneshot embodiment; however other embodiments described herein such as initial controller triggering and/or fixed length oneshot embodiments may also be used in clock error correction techniques described herein.

In timing diagram 500, a pulse 532 may be detected. At the detection of pulse 532, a $CLK_M$ signal 550 may toggle to a high state 552 because it was previously in a low state. The pulse 532 detection may also trigger the oneshot to start a oneshot interval 542. Since no other pulse was detected after pulse 532 within a predetermined time period, the oneshot may time out. The pulse count, therefore, may have an accumulated value of one in the oneshot interval. The pulse count may also confirm that the $CLK_M$ signal 550 toggling to high state 552 was correct.

Next, a spurious pulse 533 (i.e., noise induced error) may be detected. At the detection of spurious pulse 533, the $CLK_M$ signal 550 may erroneously toggle to a low state 553 because it was previously in a high state. The spurious pulse 533 detection may also trigger the oneshot to start a oneshot interval 543. Since no other pulse was detected after 533 within a predetermined time period, the oneshot may time out. The pulse count, therefore, may have an accumulated value of one in the oneshot interval. Here, the pulse count indicates a clock error because two pulses indicate a clock toggle to a low state but the accumulated value shows only one. Thus, the measurement side may determine that the $CLK_M$ signal 550 toggled to the low state 553 erroneously.

Next, a first pulse of pulse packet 534 may be detected. However, since the premature toggle to low state 553 was determined, the $CLK_M$ signal 550 may be held at its current low state and may not toggle at the detection of the first pulse in the pulse packet 534. The first pulse may also trigger the oneshot to start a oneshot interval 544. In this example, the oneshot may be re-triggered one more time based on the two pulses in pulse packet 534. After the second pulse, the re-triggerable oneshot may time out because no pulse was detected in the predetermined time period following the second pulse. The pulse count, therefore, may have an accumulated value of two. The two pulses may correspond to the falling edge of the correct clock signal transmission and validate/confirm that the $CLK_M$ signal 550 was properly held in a low state. Hence, clock errors such as premature toggling may be corrected in a next clock cycle without the errors being compounded. Therefore, embodiments of the present invention may provide low latency isolated systems with fast clock error correction.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A system, comprising:
a first circuit system;
a second circuit system; and
an isolator device coupling the first circuit system and the second circuit system,
wherein the first circuit system comprises a communication system configured to transmit across the isolator device a series of multiple pulses representing both data and a clock edge,
wherein at least one pulse of the series of pulses represents the clock edge and at least one other pulse of the series of pulses represents the data; and
wherein the second circuit system is configured to receive the series of pulses, and comprises:
a oneshot configured to frame the series of pulses, and
a controller coupled to the oneshot, configured to reconstruct the data and the clock edge based on pulses framed by the oneshot.

2. The system of claim 1, wherein the controller is configured to trigger the oneshot to start a oneshot interval, and wherein the controller is configured to reconstruct the data based on a number of received pulses during the oneshot interval.

3. The system of claim 2, wherein subsequent pulses received by the second circuit system during the oneshot interval extend the oneshot interval duration to frame a variable number of pulses.

4. The system of claim 1, wherein a first pulse received by the second circuit system triggers the oneshot to start a oneshot interval.

5. The system of claim 4, wherein subsequent pulses received during the oneshot interval extend the oneshot interval duration to frame a variable number of pulses.

6. The system of claim 1, further comprising a detector coupled to the isolator device to detect pulses received from the first circuit system, wherein the controller is configured to toggle a clock signal based on a first pulse detection by the detector.

7. The system of claim 6, wherein the controller is configured to subsequently confirm validity of a previous clock signal toggle based on the pulses framed by the oneshot and, if an error is detected, correct the error at a next clock edge.

8. The system of claim 1, wherein operation of the second circuit system is synchronized to a reconstructed clock signal obtained from reconstruction of the clock edge.

9. The system of claim 8, wherein the second circuit system further comprises a transmission system to transmit data.

10. The system of claim 9, wherein transmissions by the transmission system are synchronized to the reconstructed clock signal.

11. A method of communicating across an isolation barrier, comprising:
receiving, by a receiver, one or more pulses across an isolator device;
framing the one or more pulses in a oneshot interval, wherein framing of only a single pulse in the oneshot interval indicates a rising or falling clock edge toggle and framing of multiple pulses in the oneshot interval indicates the other of the rising or falling clock edge toggle; and
reconstructing, by a controller, clock edge information based on a number of pulses framed in the oneshot interval.

12. The method of claim 11, wherein a first pulse of the one or more pulses triggers the oneshot interval to start.

13. The method of claim 11, wherein the oneshot interval is triggered to start prior to receiving a first pulse of the one or more pulses.

14. The method of claim 11, wherein framing the one or more pulses comprises extending the oneshot interval to frame a subsequent pulse received within a threshold duration of a preceding pulse.

15. The method of claim 11, wherein greater than two pulses in the oneshot interval indicates additional data.

16. The method of claim 11, comprising reconstructing multibit data including the clock edge information.

17. A method, comprising:
receiving, by a receiver, a first pulse across an isolation barrier;
framing the received first pulse in a oneshot interval;
accumulating a packet of one or more pulses including the received first pulse during the oneshot interval;
toggling a clock signal based on receiving the first pulse;
confirming, by a controller, the clock signal toggling based on the one or more pulses accumulated in the packet; and
if an error is detected, correcting, by the controller, the error at a next packet.

18. The method of claim 17, wherein correcting comprises not toggling the clock signal at the next packet.

19. The method of claim 17, wherein framing the received first pulse in a oneshot interval comprises using a variable duration oneshot interval.

* * * * *